United States Patent
Yano et al.

[19]

[11] Patent Number: 6,061,629
[45] Date of Patent: May 9, 2000

[54] TRAFFIC NAVIGATION APPARATUS HAVING A BY-PASS FUNCTION

[75] Inventors: Fumiko Yano; Yasushi Fujii; Hirofumi Goto, all of Hyogo, Japan

[73] Assignee: Mitsubishi Denki Kabushiki Kaisha, Tokyo, Japan

[21] Appl. No.: 07/998,721

[22] Filed: Dec. 30, 1992

[30] Foreign Application Priority Data

Jan. 22, 1992 [JP] Japan ................................... 4-009064

[51] Int. Cl.[7] .................................................. G06F 165/00
[52] U.S. Cl. ...................... 701/209; 701/210; 340/990; 340/995
[58] Field of Search .................................. 364/443, 444, 364/449; 73/178 R; 340/988, 990, 995; 701/208, 209, 210

[56] References Cited

U.S. PATENT DOCUMENTS

| | | | |
|---|---|---|---|
| 4,926,336 | 5/1990 | Yamada | 364/444 |
| 5,031,104 | 7/1991 | Ikeda et al. | 340/995 |
| 5,184,303 | 2/1993 | Link | 364/444 |
| 5,187,667 | 2/1993 | Short | 364/444 |
| 5,220,507 | 6/1993 | Kirson | 364/444 |
| 5,270,937 | 12/1993 | Link et al. | 340/995 |
| 5,272,638 | 12/1993 | Martin et al. | 364/444 |
| 5,285,391 | 2/1994 | Smith, Jr. et al. | 340/995 |

FOREIGN PATENT DOCUMENTS

| | | |
|---|---|---|
| 3501039 | 7/1986 | Germany . |
| 868529/92 | of 0000 | Japan . |
| 62278118 | 11/1989 | Japan . |
| 63309537 | 6/1990 | Japan . |

*Primary Examiner*—Gary Chin

[57] ABSTRACT

A traffic navigation apparatus installed on a vehicle has a record of map data of maps which covers at least the moving range of the vehicle. The apparatus detects the current vehicle position. The user sets places to be by-passed and the destination on a displayed map. The apparatus seeks a recommendable route which connects the current position and the destination by by-passing the specified avoidance places. The apparatus permits the avoidance regions to be input by various data inputs including by inputting the telephone number or a postal zip code of the region to be avoided. It then displays a recommendable route on the map which avoids the avoidance region provided the increase of distance as compared to not avoiding the avoidance region is not more than a specified value. Otherwise it displays a recommended route which includes the avoidance region in relation with the current vehicle position.

4 Claims, 15 Drawing Sheets

SET START POINT

SET END POINT

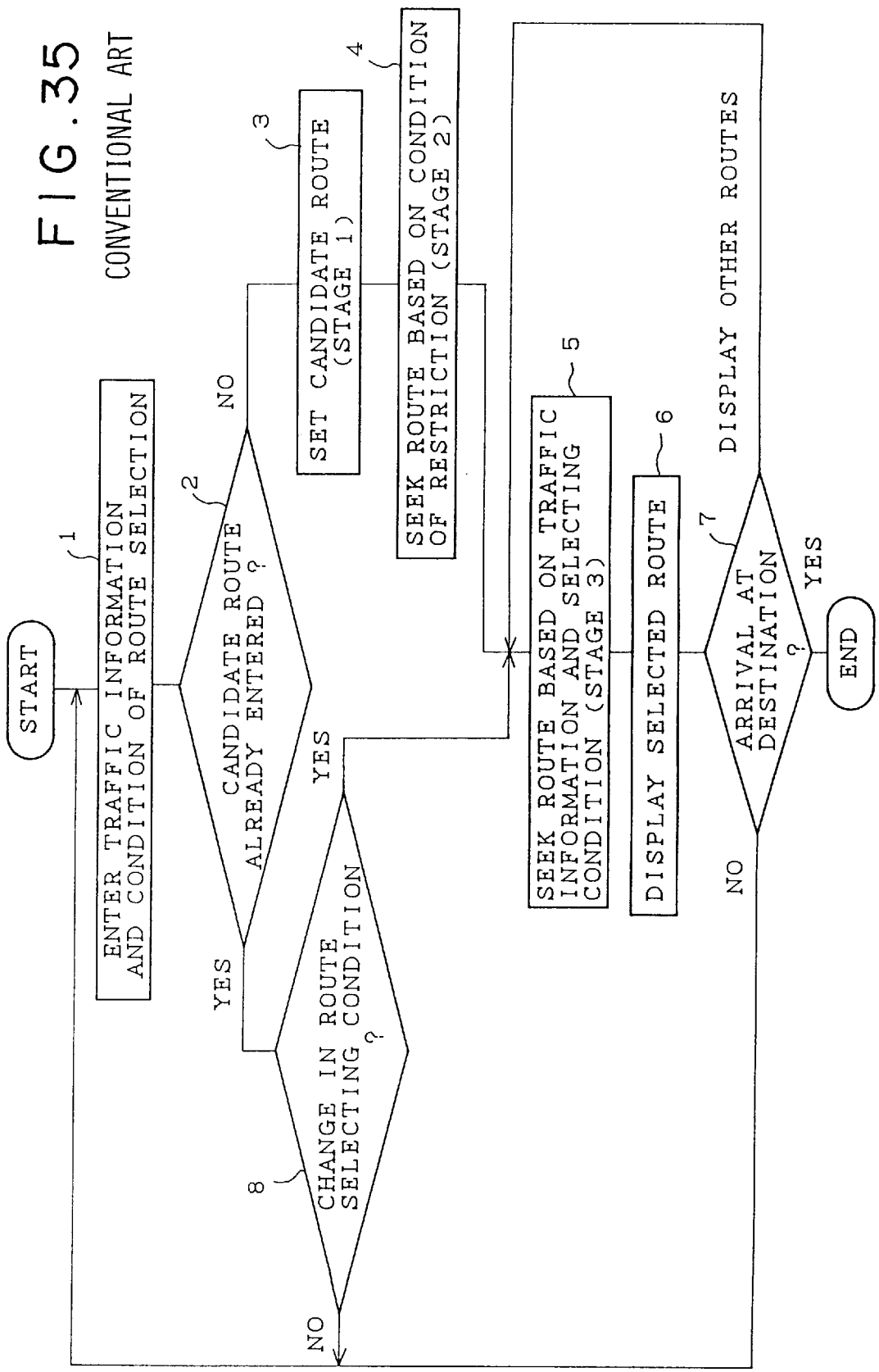

TRAFFIC NAVIGATION APPARATUS HAVING A BY-PASS FUNCTION

BACKGROUND OF THE INVENTION

1. Field of the Invention

The present invention relates to a traffic navigation apparatus installed on a vehicle for displaying routes from the current position of the vehicle to the destination thereof and a recommendable route from the current vehicle position to the destination on a displayed road map.

2. Description of the Prior Art

FIG. 34 shows the arrangement of a conventional traffic navigation apparatus disclosed in Japanese Patent Unexamined Publication No. 2-28800. In the figure, processor 1 consists of a CPU 11, a ROM 12, a RAM 13 and an input/output interface 14 connected together through a bus 15. A traffic information receiver 2 receives traffic information such as places of traffic congestion, road construction, traffic restriction and the like provided by a traffic information center using a quasi microwave system, a radiowave-guided system, or an FM multiplex communication system. A compact-disc player 3 reads out road map data from a CD-ROM which serves as a read-only memory.

A CRT display unit 4 displays map data read out of the CD-ROM and image signals produced by the processor 1 from traffic information received by the receiver 2. Indicated by 5 is an operation panel operated by a vehicle rider (driver or passenger), and 6 is a position sensor unit of an independent navigation type consisting of an azimuth sensor and a distance sensor. The processor 1 implements arithmetic processes for the signals provided by the position sensor unit 6 thereby to determine the current vehicle position.

Next, the operation of the above-mentioned conventional navigation apparatus will be explained on the flowchart of FIG. 35.

In step S1, the vehicle rider enters the start position, destination and condition of route selection through the operation panel 5. Then map information which complies with the input data is read out of the CD-ROM in the compact-disc player 3 and displayed on the CRT display 4. The processor 1 seeks a candidate route based on the specified route selecting condition (e.g., minimum distance or minimum time).

In step S2, it is tested whether or not a candidate route has already been entered. If no candidate route has yet entered, a candidate route is entered on the operation panel 5 in step S3. In step S4, routes other than the one entered in step S3 are sought by imposing another condition (e.g., within a certain distance from the entered candidate route).

In step S5, the most recommendable route among the routes sought in step S4 is selected based on the traffic information provided by the traffic information receiver 2, and the selected route is displayed on the CRT display unit 4 as shown by 30 in FIG. 36 (a). In step S7, it is tested whether or not the vehicle has reached the destination, and the process terminates on detecting the arrival.

If the vehicle has not yet reached the destination, the control sequence returns to step S1 to repeat the foregoing process, with the routine branching from step S2 to step S8 since the candidate route is already entered. In step S8, any change in traffic information or route selecting condition is tested. If no change is detected, the control sequence returns to step S1, or if any change is detected, the control sequence proceeds to step S5 to carry out a recurrent search, and a revised display is produced in step S6.

FIG. 36 (b) shows an example of the final display. The display includes marks of traffic congestion and a mark of traffic accident at a position 42 provided as a result of reception of traffic information by the traffic information receiver 2 and an altered route recommendation indicated by 40 from the current vehicle position 41 to the destination.

Although the conventional traffic navigation apparatus arranged as described above is capable of instructing a recommendable route which by-passes places of traffic congestion and accident based on traffic information received with the traffic information receiver 2, it does not consider places which the rider wants to avoid based on traffic information provided by other than the traffic information receiver 2 or based on the experience and preferance of the vehicle rider.

SUMMARY OF THE INVENTION

The present invention is intended to solve the foregoing prior art problem, and its prime object is to provide a traffic navigation apparatus capable of determining a recommendable route which by-passes places which the vehicle rider designates and for leading the vehicle along the route.

In order to achieve the above objective, the traffic navigation apparatus of the present invention is designed to allow the vehicle rider to set places to be by-passed. The apparatus seeks a recommendable route which by-passes the places which the rider wants to avoid and displays the route together with a map. Accordingly, it becomes possible to display a route through the determination process which reflects the vehicle rider's will.

BRIEF DESCRIPTION OF THE DRAWINGS

FIG. 35 is a flowchart showing the operation of the conventional apparatus; and

DESCRIPTION OF THE PREFERRED EMBODIMENTS

Embodiments of this invention will be described with reference to the drawings.

Figure 1:
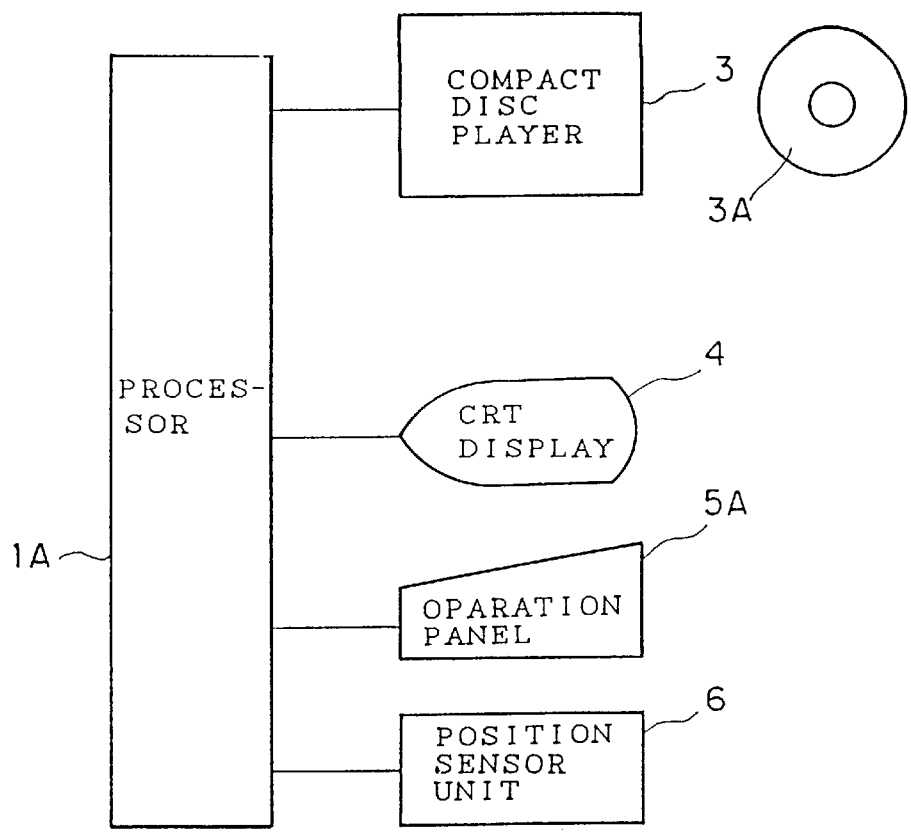
FIG. 1 is a block diagram of the navigation apparatus based on a first embodiment of this invention.

Embodiment 1:

FIG. 1 shows the arrangement of the traffic navigation apparatus based on the first embodiment of this invention. The apparatus comprises a processor 1A which controls the map display operation and the like, a compact-disc player 3, a CD-ROM 3A which stores map information, a display unit 4 having a CRT screen or the like for displaying map data which is read out of the CD-ROM 3A and processed by the processor 1A, an operation panel 5A operated by the vehicle driver, and a position sensor unit of an independent navigation type 6 which consists of an azimuth sensor and distance sensor, with the sensor output signals being processed arithmetically by the processor 1A thereby to locate the current vehicle position.

Figure 2:
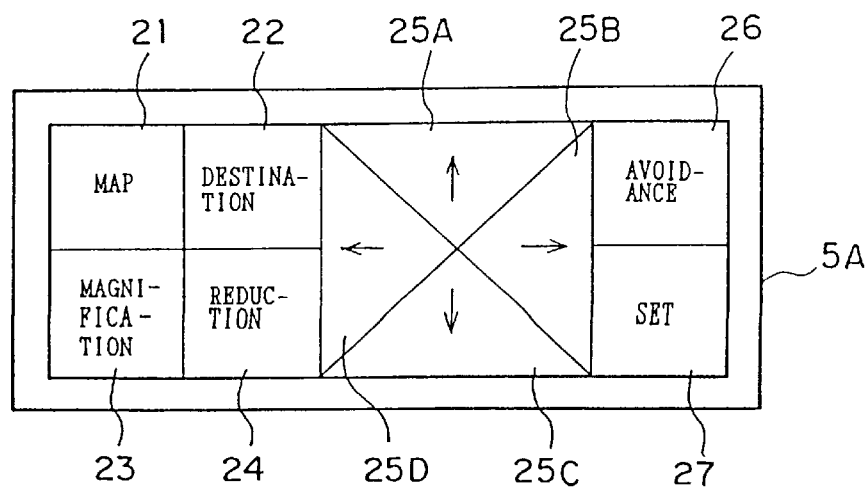
FIG. 2 is a diagram showing the operation panel of this apparatus.

FIG. 2 is a top view of the operation panel 5A, which includes a map key switch 21, a destination setting key switch 22, a magnification key switch 23, a reduction key switch 24, scroll key switches 25A–25D, an avoidance key switch 26, and a set key switch 27.

Figure 3:
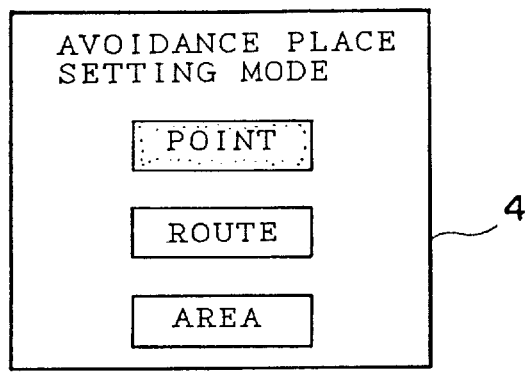
FIG. 3 through FIG. 18 are diagrams showing examples of display based on this embodiment.
Figure 4:
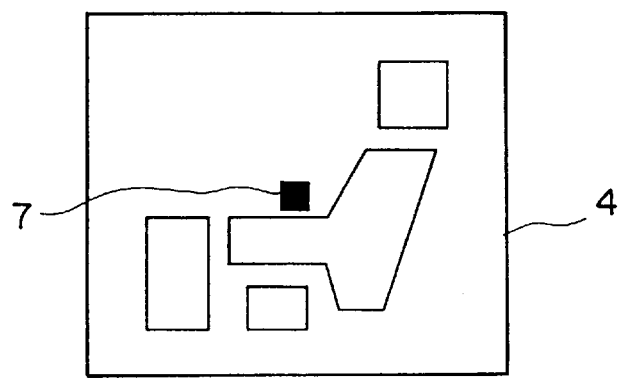

Next, the operation will be explained. Initially, when the vehicle rider presses the avoidance key 26, the processor 1A displays a by-pass setting screen on the screen of display unit 4 as shown in FIG. 3. On the screen, the POINT label is highlighted in different color, indicative of the point setting mode for by-passing. Subsequently, when the set key 27 is pressed, the processor 1A reads out map data of a nation-wide road map from the CD-ROM 3A which is set in the compact-disc player 3, and displays the map on the screen as shown in FIG. 4. A cursor 7 is placed at the center of the screen.

Figure 5:
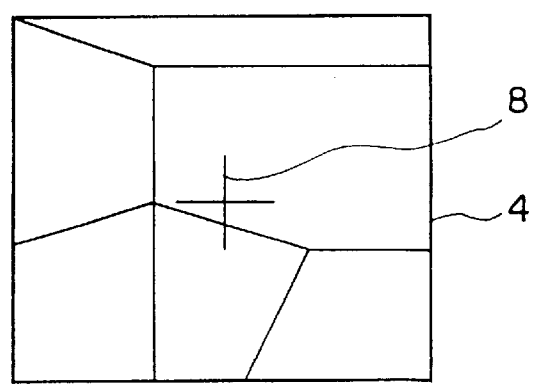

Next, the vehicle rider operates the scroll keys 25A–25D to move the cursor 7 to the position on the map to be by-passed. When the magnification key 23 is pressed, the processor 1A reads map data of the map area around the cursor 7 out of the CD-ROM 3A, and displays the detailed map centered by the cursor 7 on the screen, with a reticle mark 8 being spotted at the screen center as shown in FIG. 5.

Figure 6:
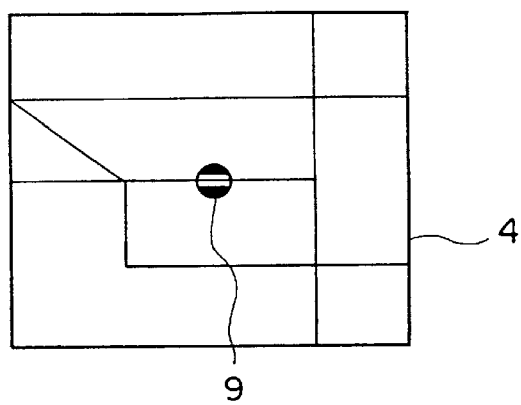

Next, the vehicle rider operates the scroll keys 25A–25D to move the map so that the avoidance point is located at the screen center. When the set key 27 is pressed, the processor 1A recognizes the map center to be the avoidance point, and spots an avoidance point mark 9 at the map center as shown in FIG. 6.

Figure 7:
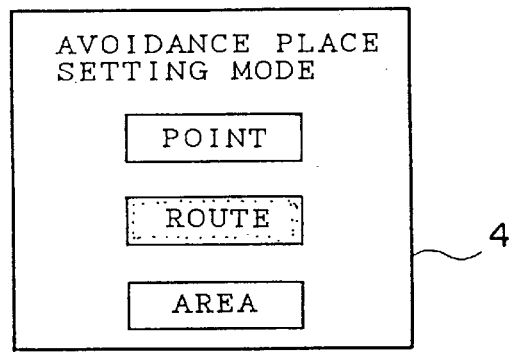
Figure 8:
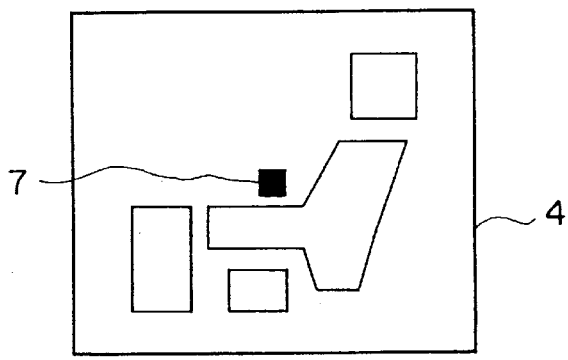

Returning to the display of FIG. 3, if the vehicle rider presses the scroll key 25C, the processor 1A highlights the ROUTE label in different color on the screen indicative of the route setting mode for by-passing as shown in FIG. 7. Subsequently, when the set key 27 is pressed, the processor 1A reads out map data of a nation-wide road map from the CD-ROM 3A in the compact-disc player 3, and displays the map on the screen, with the cursor 7 being placed at the screen center, as shown in FIG. 8.

Figure 9:
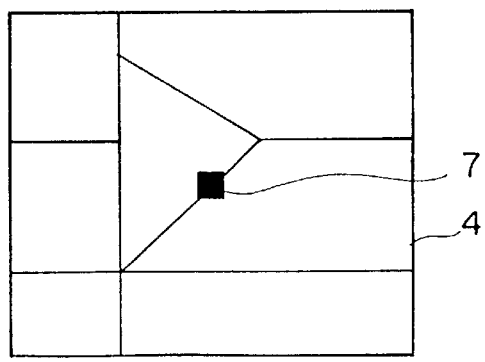
Figure 10:
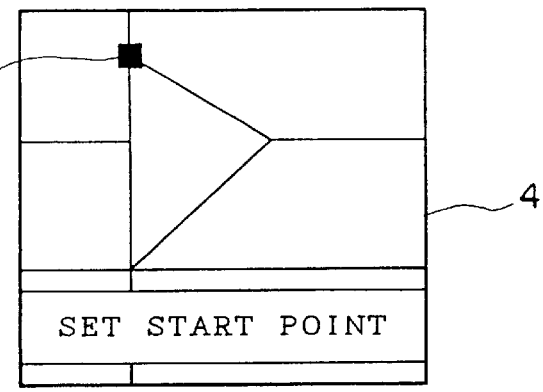

Next, the vehicle rider operates the scroll keys 25A–25D to move the cursor 7 to the position to be by-passed. When the magnification key 23 is pressed, the processor 1A reads map data of the map area around the cursor 7 out of the CD-ROM 3A, and displays the detailed map centered by the cursor 7 on the screen, with the cursor 7 being placed at the screen center as shown in FIG. 9. Subsequently, the vehicle rider operates the scroll keys 25A–25D to move the cursor 7 to a road section of avoidance which is intended to set. When the set key 27 is pressed, the processor 1A displays a message "Set start point." on the screen as shown in FIG. 10.

Figure 11:
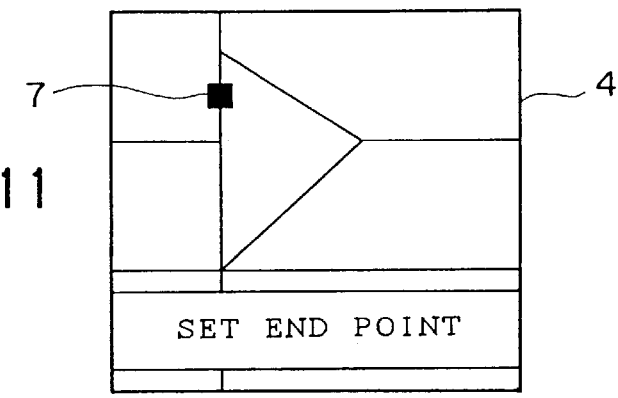

Next, when the vehicle rider operates the scroll keys 25A–25D, the cursor 7 moves along the selected road. The vehicle rider brings the cursor 7 to the point to be set as the start point of avoidance place, and presses the set key 27. Then, the processor 1A recognizes the cursor position on the road to be the circumvention start point, and displays a message "Set end point." as shown in FIG. 11.

Figure 12:
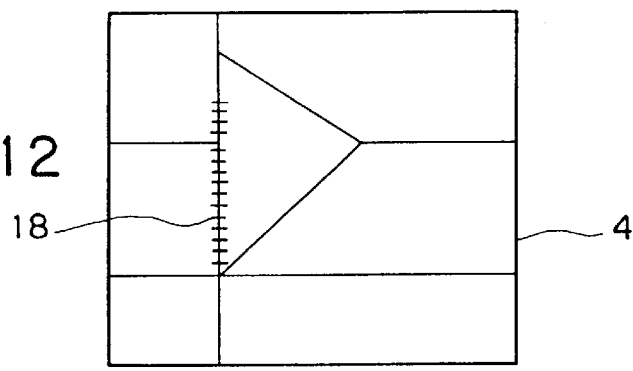

Next, when the vehicle rider operates the scroll keys 25A–25D, the cursor 7 moves again along the road. The vehicle rider brings the cursor 7 to the point to be set as the circumvention end point, and presses the set key 27. Then, the processor 1A recognizes the cursor position on the road to be the end point of avoidance place, and displays the road section 18 to be by-passed on the screen as shown in FIG. 12.

Figure 13:
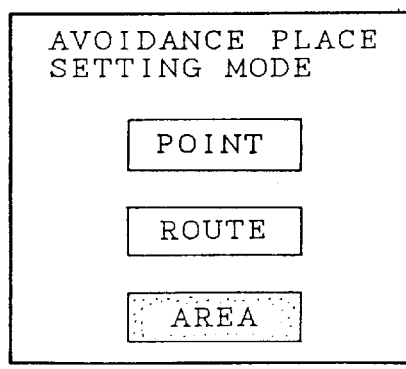
Figure 14:
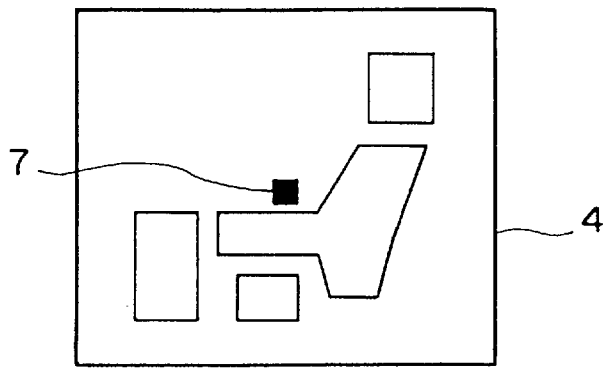

Returning to the display of FIG. 7, if the vehicle rider presses the scroll key 25C, the processor 1A highlights the AREA label in different color on the screen indicative of the area setting mode for by-passing as shown in FIG. 13. Subsequently, when the set key 27 is pressed, the processor 1A reads out map data of a nation-wide road map from the CD-ROM 3A in the compact-disc player 3, and displays the map on the screen, with the cursor 7 being placed at the screen center, as shown in FIG. 14.

Figure 15:
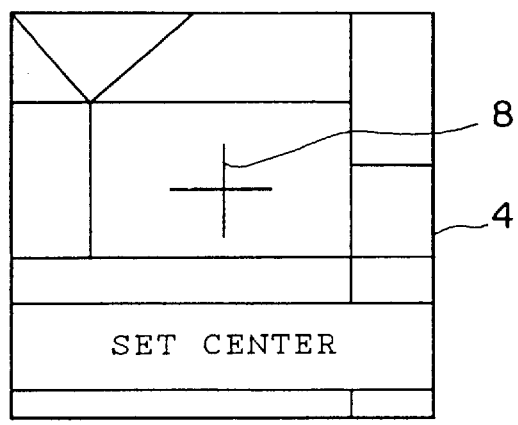

Next, when the vehicle rider operates the scroll keys 25A–25D to move the cursor 7 to the position on the map to be by-passed and the magnification key 23 is pressed, the processor 1A reads map data of the map area around the cursor 7 out of the CD-ROM 3A, and displays the detailed map centered by the cursor 7, with the reticle mark being spotted at the screen center, and a message "Set center." as shown in FIG. 15.

Figure 16:
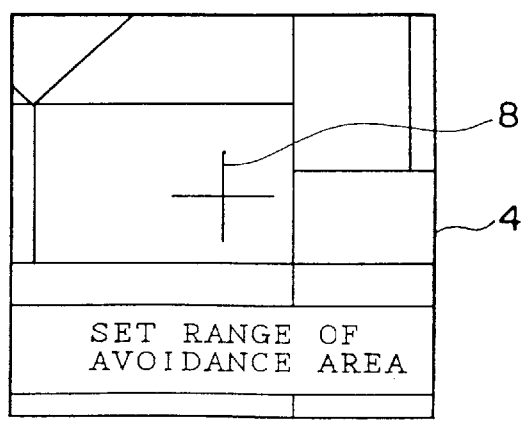
Figure 17:
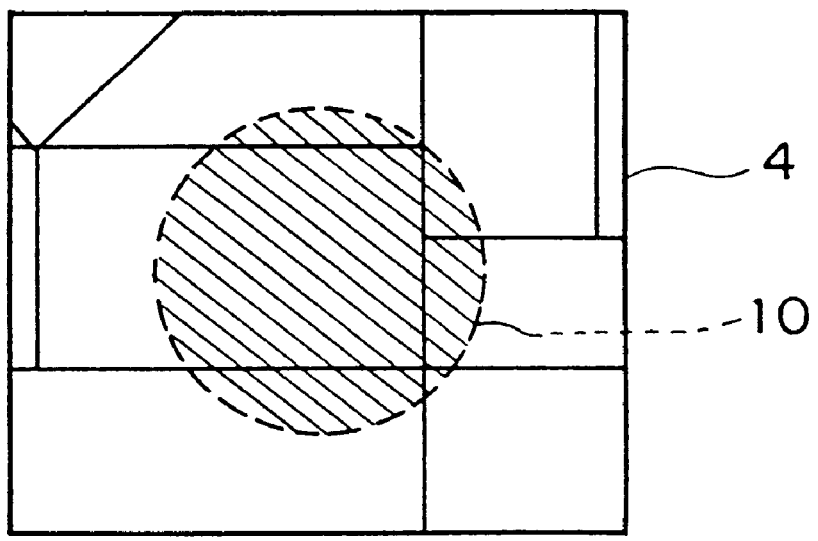

Next, the vehicle rider operates the scroll keys 25A–25D to bring the map center to the center of the area of circumvention which is intended to set. When the set key 27 is pressed, the processor 1A recognizes the map center to be the center of avoidance area, and displays a message "Set range of avoidance area." as shown in FIG. 16.

Next, when the vehicle rider operates the scroll keys 25A–25D, a circle expands from the center of avoidance area. When the set key 27 is pressed, the processor 1A recognizes the area enclosed by the circle to be the avoidance area 10, and highlights the area in different color.

The processor 1A calculates the current position and moving direction of the vehicle from the signals provided by the independent navigation type position sensor unit 6. When the vehicle rider sets the destination by using the key 22, the processor 1A seeks a recommendable route from the current position to the destination which by-passes the avoidance area that has been set as described above.

Figure 18:
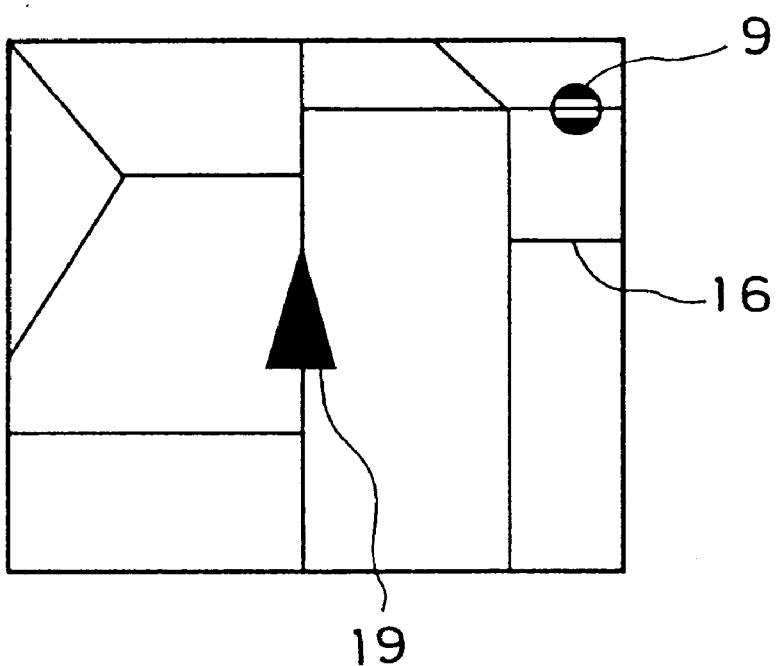

Next, when the vehicle rider presses the map key 21, the processor 1A reads map data around the calculated current position out of the CD-ROM 3A which is set in the compact-disc player 3, and displays the map and the recommendable route on the screen, with a current position mark 19 being spotted on it. FIG. 18 shows an example of display on the display unit 4. The recommendable route 16 starts from the current vehicle position indicated by the mark 19, and by-passes the avoidance point indicated by the mark 9.

Figure 19:
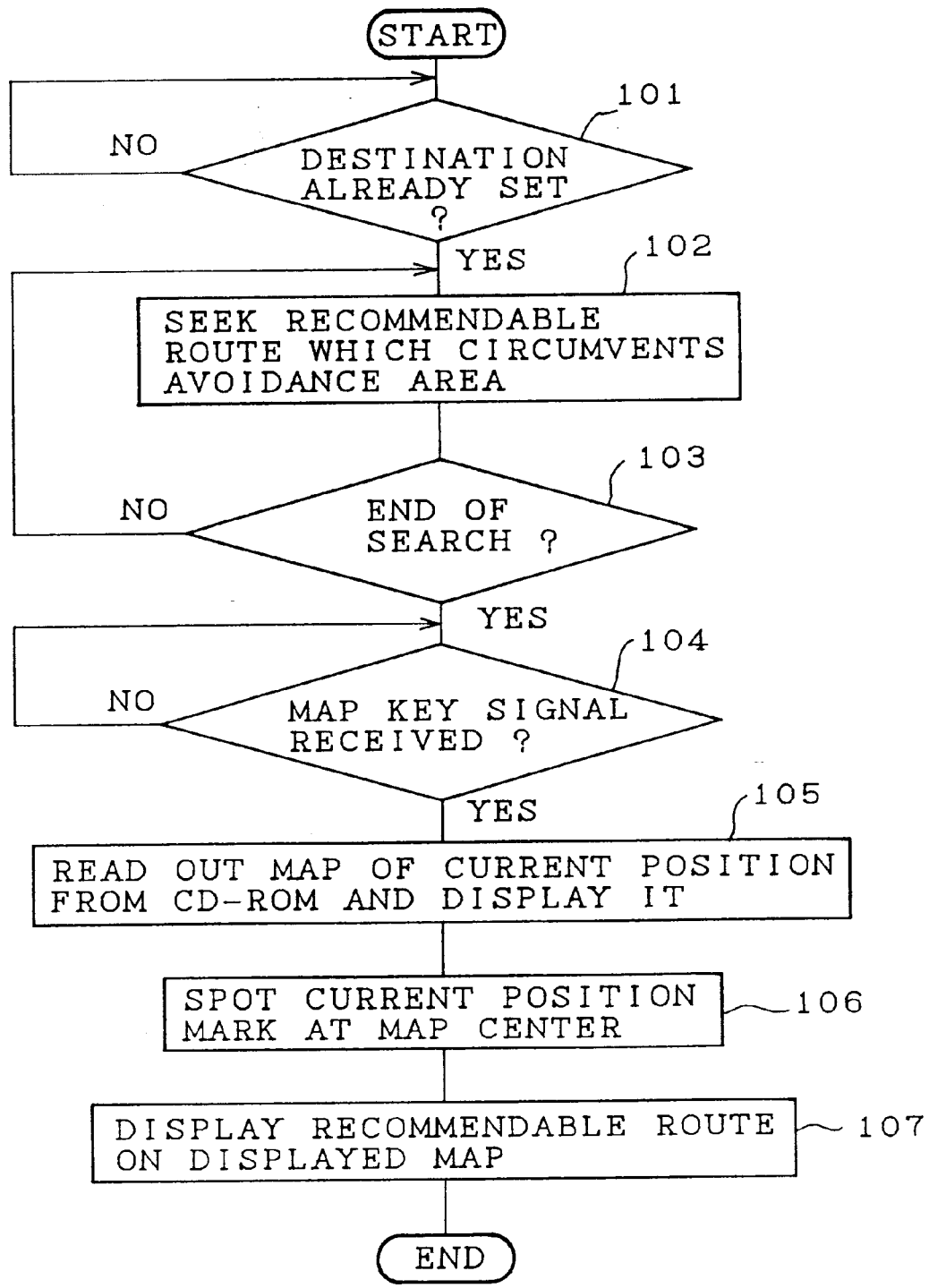
FIG. 19 is a flowchart showing the operation of the processor based on this embodiment.

The foregoing is the basic operation of the traffic navigation apparatus based on the first embodiment of this invention. The following explains the basic operation of the processor 1A for seeking and displaying a recommendable route with reference to the flowchart of FIG. 19.

Initially, step 101 tests whether or not the destination is already set. If it is set, step 102 seeks a recommendable route 16 which by-passes the avoidance place that has been set.

Step 103 tests whether or not the seek operation of recommendable route is completed. If it is completed, step 104 tests whether or not the signal of map key 21 is received. If the signal reception is confirmed, the control sequence proceeds to step 105, in which map data of the current vehicle position is read out of the CD-ROM 3A and displayed on the display unit 4. The subsequent step 106 spots the current position mark 19 at the center of the displayed map, and finally step 107 displays the recommendable route which by-passes the avoidance place on the displayed map on the display unit 4.

The following are variant embodiments concerning the definition of the point 9 or road section 18 to be by-passed which is carried out in the foregoing first embodiment by using the cursor 7 displayed on the display unit 4

Embodiment 2:

This embodiment displays such map information as the names of crossings and interchanges and the names of places on a map displayed on the display unit 4, so that an avoidance point 9 is set in terms of the displayed map information.

Embodiment 3:

This embodiment displays a list of such map information as the names of crossings and interchanges and the names of places on the display unit 4, so that an avoidance point 9 is set in terms of the listed map information.

Embodiment 4:

This embodiment is designed to set an avoidance point 9 by inputting the coordinates of the displayed map.

Embodiment 5:

This embodiment is designed to set a road section 18 to be by-passed in terms of the road name or road number.

Embodiment 6:

This embodiment displays such map information as the names of crossings and interchanges on the map displayed on the display unit 4, so that a road section 18 to be by-passed is set in terms of the displayed map information.

Embodiment 7:

This embodiment displays a list of such map information as the names of crossings and interchanges on the display unit 4, so that a road section 18 to be by-passed is set in terms of the listed map information.

Embodiment 8:

This embodiment is designed to set a road section 18 to be by-passed by inputting coordinates of two points on the displayed map.

Embodiment 9:

This embodiment is designed to set a road section 18 to be by-passed in terms of the nodes of roads. The arrangement of the overall apparatus and the operation panel 5A of this embodiment is the same as shown in FIGS. 1 and 2. The operation of this embodiment will be explained in the following.

Figure 20:
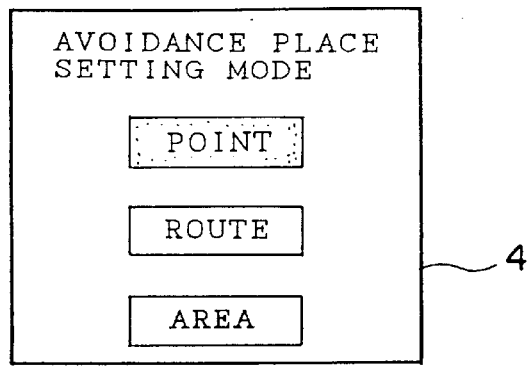
FIG. 20 through FIG. 27 are diagrams showing examples of display based on a second embodiment of this invention.
Figure 21:
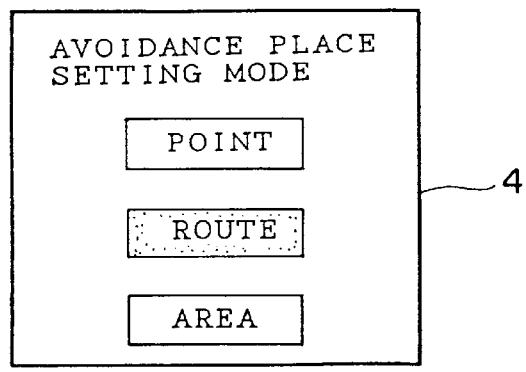

When the vehicle rider presses the avoidance key 26, the processor 1A displays an avoidance place setting screen on the screen of display unit 4 as shown in FIG. 20. The display has the POINT label highlighted in different color indicative of the point setting mode for by-passing. If the scroll key 25C is pressed on the display of FIG. 20, the processor 1A highlights the ROUTE label in different color indicative of the route setting mode for by-passing as shown in FIG. 21.

Figure 22:
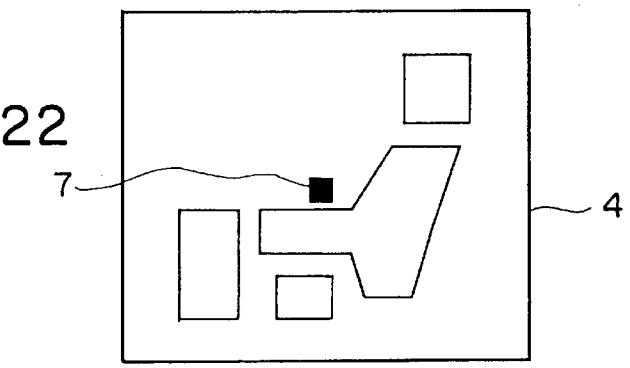

Subsequently, when the set key 27 is pressed, the processor 1A reads out map data of a nation-wide road map from the CD-ROM 3A which is set in the compact-disc player 3, and displays the map on the screen as shown in FIG. 22. The cursor 7 is placed at the center of the screen.

Figure 23:
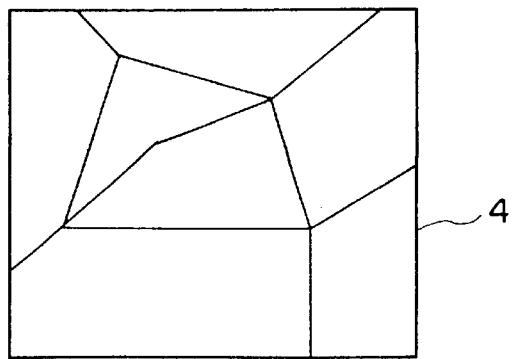

Next, the vehicle rider operates the scroll keys 25A–25D to move the cursor 7 to the position on the map to be by-passed. When the magnification key 23 is pressed, the processor 1A reads map data of the map area around the cursor 7 out of the CD-ROM 3A, and displays the detailed map centered by the cursor 7 on the screen as shown in FIG. 23.

Figure 24:
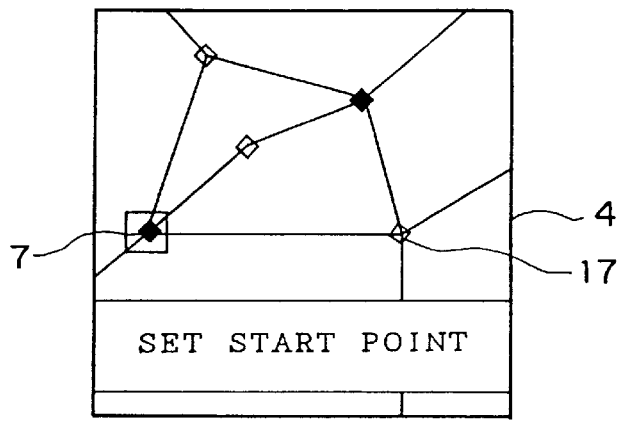

Next, when the vehicle rider presses the set key 27, the processor 1A displays a message "Set start point." on the screen, with node marks 17 being spotted on nodes of roads on the displayed map as shown in FIG. 24. The cursor 7 is placed on the leftmost node mark 17, indicative of its default selection. Other nodes of roads in linkage with the node pointed by the cursor 7 have their node marks 17 highlighted in different color.

When the vehicle rider operates the scroll keys 25A–25D, the cursor 7 moves to one of the highlighted nodes 17, and other nodes of roads in linkage with the node which is now pointed by the cursor 7 have their node marks highlighted in different color.

Figure 25:
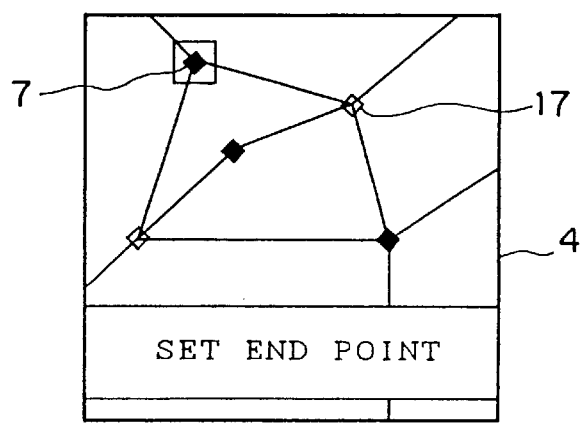

The vehicle rider brings the cursor 7 to a node mark 17 which is intended to be the start point of circumvention, and presses the set key 27. Then, the processor 1A recognizes the node selected by the cursor 7 to be the start point of avoidance route, and displays a message "Set end point." on the screen as shown in FIG. 25.

Figure 26:
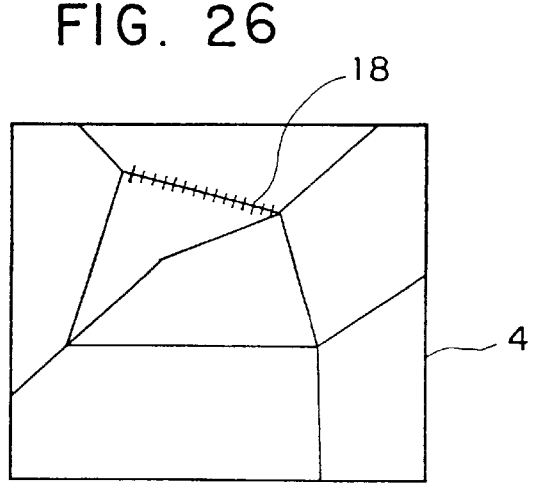

Next, the vehicle rider operates the scroll keys 25A–25D to bring the cursor 7 to a node mark 17 which is intended to be the end point of avoidance route, and presses the set key 27. Then, the processor 1A recognizes the node selected by the cursor 7 to be the end point of an avoidance route, and displays a road section 18 to be by-passed as shown in FIG. 26.

The processor 1A calculates the current position and moving direction of the vehicle from the signals provided by the position sensor unit 6. The vehicle rider sets the destination by using the key 22, and the processor 1A seeks a recommendable route from the current position to the destination which by-passes the avoidance road section that has been set as described above.

Figure 27:
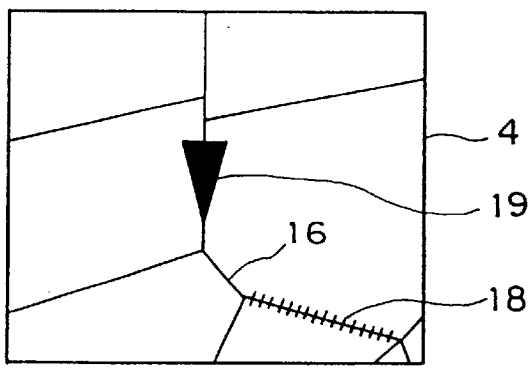

Next, when the vehicle rider presses the map key 21, the processor 1A reads map data around the calculated current position out of the CD-ROM 3A in the compact-disc player 3, and displays the map and the recommendable route 16 which by-passes the road section 18, and spots the current position mark 19 on the screen as shown in FIG. 27. The flowchart of the operation is identical to that of the first embodiment.

Embodiment 10:

This embodiment is designed to set a road section to be by-passed through the selection of a link. The arrangement of the overall apparatus and the operation panel 5A of this embodiment is the same as shown in FIGS. 1 and 2. The operation of this embodiment will be explained in the following.

Figure 28:
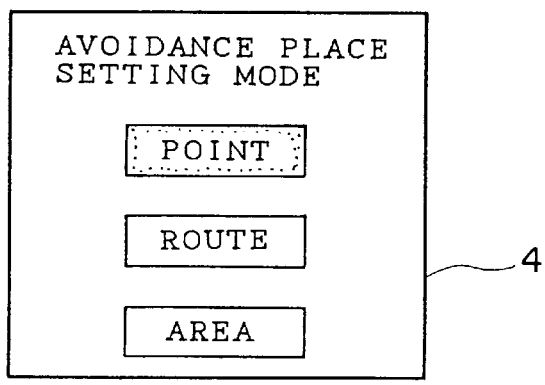
FIG. 28 through FIG. 33 are diagrams showing examples of display based on a third embodiment of this invention.
Figure 29:
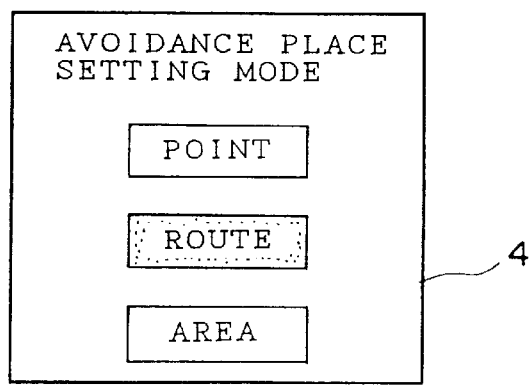

When the vehicle rider presses the avoidance key 26, the processor 1A displays an avoidance place setting screen on the screen of display unit 4 as shown in FIG. 28. The display has the POINT label highlighted in different color indicative of the point setting mode for by-passing. If the scroll key 25C is pressed on the display of FIG. 28, the processor 1A highlights the ROUTE label in different color indicative of the route setting mode for by-passing as shown in FIG. 29.

Figure 30:
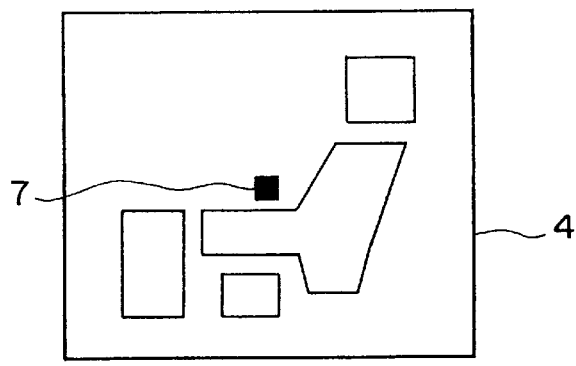

Subsequently, when the set key 27 is pressed, the processor 1A reads out map data of a nation-wide road map from the CD-ROM 3A which is set in the compact-disc player 3, and displays the map on the screen as shown in FIG. 30. The cursor 7 is placed at the center of the screen.

Figure 31:
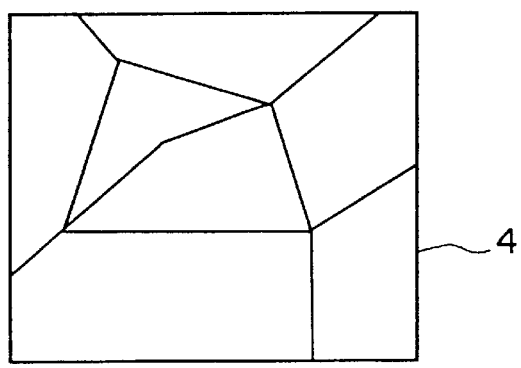

Next, the vehicle rider operates the scroll keys 25A–25D to move the cursor 7 to the position on the map to be by-passed. When the magnification key 23 is pressed, the processor 1A reads map data of the map area around the cursor 7 out of the CD-ROM 3A, and displays the detailed map centered by the cursor 7 on the screen as shown in FIG. 31.

Figure 32:
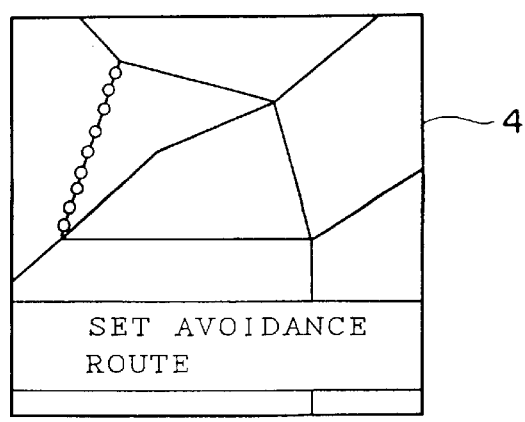

Next, when the vehicle rider presses the set key 27, the processor 1A displays a message "Set a link road to be by-passed." on the screen, with marks "∘" being spotted on the leftmost link road on the displayed map indicative of its default selection as shown in FIG. 32. It is not allowed to select a road section having its node outside of the screen. Other link roads in connection with nodes of the selected link road are highlighted in different color.

If the vehicle rider operates the scroll keys 25A–25D, the "○" marks are plotted on one of the highlighted link roads, and link roads in connection with the nodes are now highlighted in different color.

Figure 33:
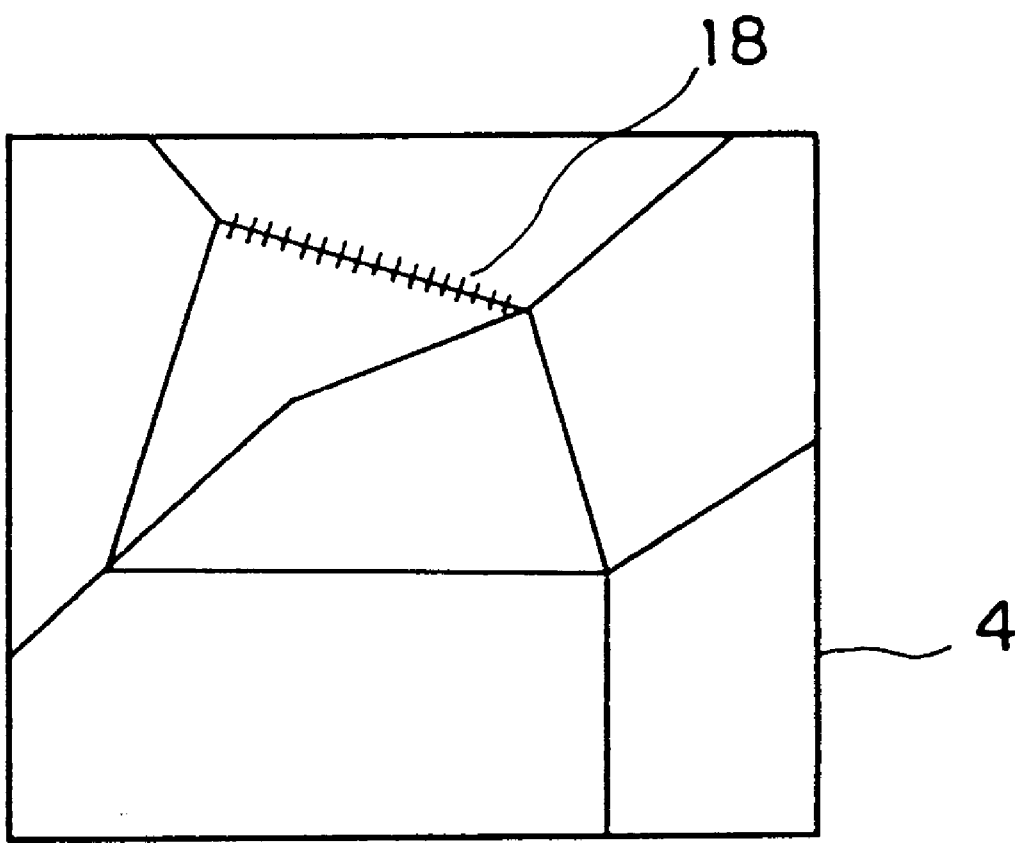
Figure 34:
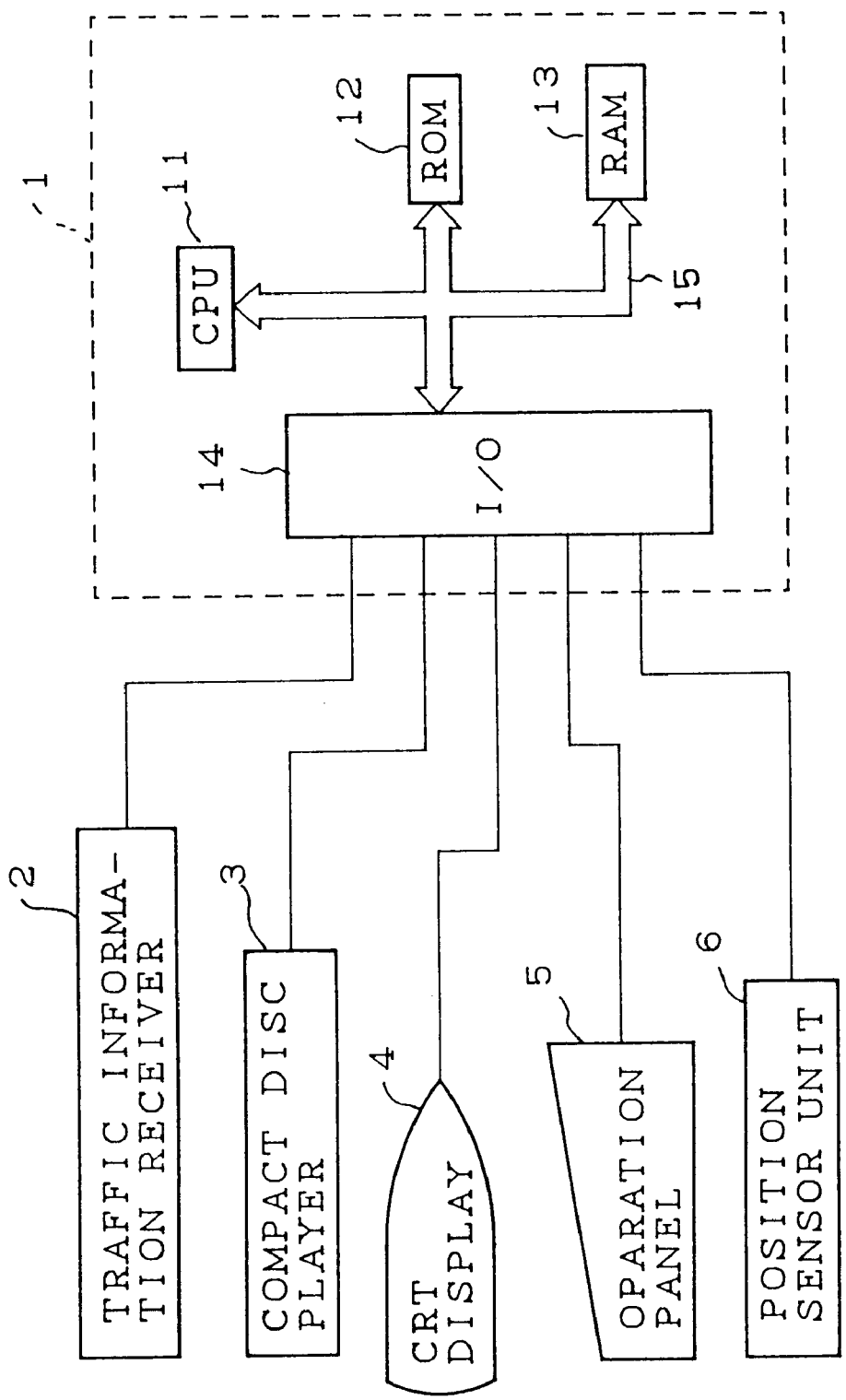
FIG. 34 is a block diagram of the conventional traffic navigation apparatus.
Figure 36A:
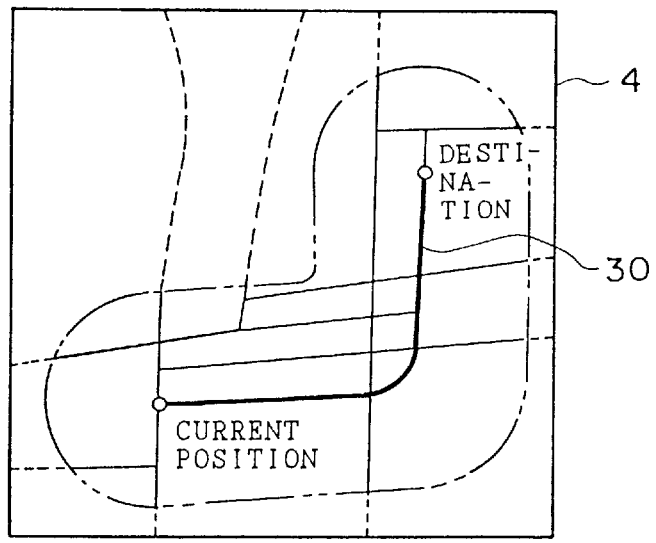
FIGS. 36 (a)–36 (b) are a set of diagrams showing examples of display based on the conventional apparatus.
Figure 36B:
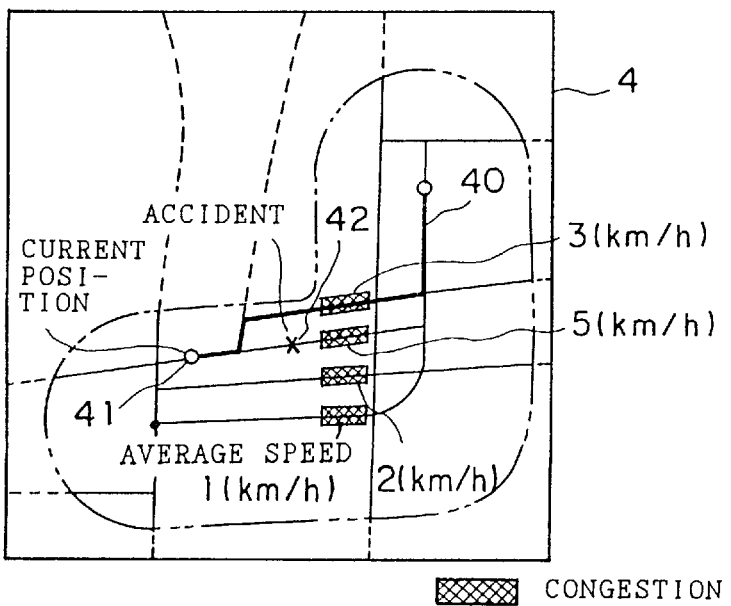

Next, when the vehicle rider presses the set key 27, the processor 1A recognizes the selected link road to be the road section to be by-passed, and displays the road section 18 on the screen as shown in FIG. 33. The subsequent operation of the processor for seeking and displaying a recommendable route 16 is identical to the embodiment 9.

The following are variant embodiments concerning the definition of an area 10 to be by-passed which is carried out in the foregoing first embodiment through the operation of the scroll keys for specifying the center and size of a circle.

Embodiment 11:

This embodiment displays such map information as the names of crossings and interchanges and the names of railroad stations and places on a map displayed on the display unit 4, so that an avoidance area 10 is set in terms of the displayed map information.

Embodiment 12:

This embodiment displays a list of such map information as the names of crossings and interchanges and the names of railroad stations and places on the display unit 4, so that an avoidance area 10 is set in terms of the listed map information.

Embodiment 13:

This embodiment is designed to set an avoidance area 10 in terms of the address, telephone number, or postal zip code.

The following are variant embodiments concerning the shape of an area 10 to be by-passed which is a circular area in the foregoing first embodiment.

Embodiment 14:

This embodiment defines a rectangular avoidance area on a displayed map.

Embodiment 15:

This embodiment defines a polygonal avoidance area on a displayed map.

Embodiment 16:

This embodiment defines a rectangular avoidance area through the numerical entry of the coordinates of two significant points of a rectangle on a displayed map.

Embodiment 17:

This embodiment defines a polygonal avoidance area through the numerical entry of the coordinates of vertexes of a polygon on a displayed map.

Embodiment 18:

This embodiment, derived from the first embodiment, calculates the increase of the distance of a recommendable route 16 which circumvents an avoidance place, and determines a final recommendable route which by-passes or does not by-pass a place of circumvention depending on the increase of distance. For example, if the recommendable route with the by-pass is longer than 20 km without the by-pass, the route without the by-pass is finally selected as a recommendable route.

Embodiment 19:

This embodiment, derived from the first embodiment, calculates the increase of the distance of a recommendable route 16 which circumvents an avoidance place, indicates the increase of distance to the vehicle rider, and lets the vehicle rider choose one of the recommendable route with the by-pass or that without the by-pass thereby to determine a final recommendable route.

Embodiment 20:

This embodiment, derived from the first embodiment, lets the vehicle rider set a permissible elongation of by-passed route, calculates the increase of the distance of a recommendable route 16 which circumvents an avoidance place, and determines a final recommendable route without the by-pass if the increase of distance exceeds a specified value.

According to the traffic navigation apparatus of this invention, as described above, it is possible to set places to be by-passed based on traffic information provided by other than the traffic information receiver and also on the experience, knowledge and preference of the vehicle rider, whereby an optimal recommendable route can be determined.

What is claimed is:

1. A traffic navigation apparatus for a vehicle comprising:

means for storing map data of a map which covers at least a moving range of said vehicle;

means for detecting the current position of said vehicle;

means for setting an avoidance region on said map to be by-passed by said vehicle;

means for specifying two arbitrary points on said map;

first search means for seeking a recommendable route between said two points;

second search means for seeking a recommendable route which connects said two points by by-passing said avoidance region; and means for displaying the recommendable route which is sought by said first search means together with said map based on the current position if a difference between a distance of the recommendable route sought by said first search means and a distance of the recommendable route sought by said second search means is larger than a predetermined value, and otherwise displaying the recommendable route which is sought by said second search means together with said map based on the current position.

2. A traffic navigation apparatus according to claim 1, wherein said avoidance region is set using a telephone number.

3. A traffic navigation apparatus according to claim 1 wherein said avoidance region is set using a postal zip code.

4. A traffic navigation method for a vehicle comprising:

storing map data of a map which covers at least a moving range of said vehicle;

detecting a current position of said vehicle;

setting an avoidance region on said map to be by-passed by said vehicle;

specifying two arbitrary points on said map and determining a recommendable route between said two points;

determining a recommendable route between said two points by by-passing said avoidance region; and displaying the recommendable route, together with said map, based on the current position if the increase in distance between the recommendable route by by-passing the avoidance region and the recommendable route is larger than a predetermined value, and otherwise displaying the recommendable route by-passing the avoidance region, together with said map.

* * * * *